United States Patent
Kato

[11] Patent Number: 5,818,505
[45] Date of Patent: Oct. 6, 1998

[54] OPTICAL SCANNING APPARATUS INCLUDING A LENS HAVING ASPHERICAL SURFACES ON BOTH SIDES

[75] Inventor: Manabu Kato, Kawasaki, Japan

[73] Assignee: Canon Kabushiki Kaisha, Tokyo, Japan

[21] Appl. No.: 522,118

[22] Filed: Aug. 31, 1995

[30] Foreign Application Priority Data

Sep. 6, 1994 [JP] Japan .................................. 6-239386

[51] Int. Cl.⁶ .................................................. B41J 2/47
[52] U.S. Cl. .......................................... 347/258; 347/259
[58] Field of Search .................................. 347/258, 259, 347/260, 243, 244

[56] References Cited

U.S. PATENT DOCUMENTS

| | | | |
|---|---|---|---|
| 5,038,156 | 8/1991 | Kuroda | 347/259 |
| 5,111,219 | 5/1992 | Makino | 346/108 |
| 5,128,795 | 7/1992 | Endou et al. | 359/207 |
| 5,200,850 | 4/1993 | Iizuka et al. | 359/206 |
| 5,563,729 | 10/1996 | Nakamura et al. | 359/205 |

FOREIGN PATENT DOCUMENTS

| | | |
|---|---|---|
| 0559423 | 9/1993 | European Pat. Off. . |
| 61-48684 | 10/1986 | Japan . |
| 63-157122 | 6/1988 | Japan . |
| 4-50908 | 2/1992 | Japan . |
| 4104213 | 4/1992 | Japan . |

Primary Examiner—Mark J. Reinhart

[57] ABSTRACT

An optical scanning apparatus has a light source, a first optical system for converting luminous flux emitted from the light source to converged luminous flux, a deflector for deflecting the converged luminous flux emitted from the first optical system, and a second optical system for forming an image in a spot shape on the plane to be scanned from luminous flux deflected by the deflector. The second optical system comprises a single lens. Parameters $R_1$, $R_2$, $Y_{max}$, $S_1$, $S_2$, and d of the single lens satisfy the following expressions, with $R_1$ denoting the paraxial curvature radius of the lens surface facing the deflector in the single lens, $R_2$ denoting the paraxial curvature radius of the lens surface facing the plane to be scanned in the single lens, $Y_{max}$ denoting the maximum effective diameter on the main scanning plane of the single lens, $S_1$ denoting an aspherical-surface amount from the paraxial lens surface of the lens surface facing the deflector at the maximum effective diameter $Y_{max}$, $S_2$ denoting an aspherical-surface amount from the paraxial lens surface of the lens surface facing the plane to be scanned at the maximum effective diameter $Y_{max}$, and d denoting the center thickness of the single lens:

$$0 < R_1 < R_2$$

$$(R_1^2 - Y_{max}^2)^{1/2} - R_1 < S_1 < 0$$

$$(R_2^2 - Y_{max}^2)^{1/2} - R_2 - d < S_2 < (R_2^2 - Y_{max}^2)^{1/2} - R_2.$$

23 Claims, 12 Drawing Sheets

FIG. 8

| | | | | fθ-LENS SHAPE | |
|---|---|---|---|---|---|
| | | | | FIRST SURFACE | SECOND SURFACE |
| WAVELENGTH | λ(nm) | 780 | R | 6.5220E+01 | 1.5003E+02 |
| fθ-LENS REFRACTIVE INDEX | n | 1.519 | K | -1.6158E+01 | -1.0331E+02 |
| POLYGON-MIRROR INCIDENT ANGLE | θi | -90 | B4 | -9.2497E-07 | -2.2461E-06 |
| POLYGON-MIRROR MAXIMUM OUTPUT ANGLE | θmax | 45 | B6 | -9.6904E-12 | 6.7766E-10 |
| DISTANCE BETWEEN POLYGON-MIRROR AND fθ LENS | e | 36 | B8 | 8.8464E-14 | -3.0973E-13 |
| fθ-LENS CENTER THICKNESS | d | 10 | B10 | -4.7942E-18 | 7.9836E-17 |
| DISTANCE BETWEEN fθ LENS AND PLANE TO BE SCANNED | Sk | 111.5 | r | -2.8624E+01 | -1.1796E+01 |
| fθ-LENS MAXIMUM EFFECTIVE DIAMETER | Ymax | 42 | D2E | | 2.8072E-04 |
| fθ-LENS FOCAL LENGTH | ft | 213.7 | D4E | | -4.4502E-07 |
| COLLIMATOR CONVERGENCE DEGREE | fc | 317.3 | D6E | | 3.1689E-10 |
| | | | D8E | | -1.2305E-13 |
| | | | D10E | | 1.9682E-17 |
| | | | D2S | | 2.6717E-04 |
| | | | D4S | | -4.3192E-07 |
| | | | D6S | | 3.0311E-10 |
| | | | D8S | | -1.1220E-13 |
| | | | D10S | | 1.6618E-17 |
| POLYGON-MIRROR NATURAL CONVERGENCE POINT | | | | | |

FIG. 9

| | | | fθ-LENS SHAPE | |
|---|---|---|---|---|
| | | | FIRST SURFACE | SECOND SURFACE |
| WAVELENGTH | λ(nm) | 780 | | |
| fθ-LENS REFRACTIVE INDEX | n | 1.519 | | |
| POLYGON-MIRROR INCIDENT ANGLE | θi | -90 | | |
| POLYGON-MIRROR MAXIMUM OUTPUT ANGLE | θmax | 45 | | |
| DISTANCE BETWEEN POLYGON-MIRROR AND fθ LENS | e | 32.1 | | |
| fθ-LENS CENTER THICKNESS | d | 8 | | |
| DISTANCE BETWEEN fθ LENS AND PLANE TO BE SCANNED | Sk | 111.5 | | |
| fθ-LENS MAXIMUM EFFECTIVE DIAMETER | Ymax | 42 | | |
| fθ-LENS FOCAL LENGTH | ft | 226 | | |
| COLLIMATOR CONVERGENCE DEGREE | | | | |
| POLYGON-MIRROR NATURAL CONVERGENCE POINT | fc | 302 | | |
| | R | | 4.5160E+01 | 6.8961E+01 |
| | K | | -1.0754E+01 | -2.6413E+01 |
| | B4 | | -1.2518E-06 | -2.5621E-06 |
| | B6 | | -4.0553E-11 | 7.2312E-10 |
| | B8 | | 4.3592E-14 | -3.8529E-13 |
| | B10 | | 5.6642E-18 | 7.8312E-17 |
| | r | | -2.4679E+01 | -1.0520E+01 |
| | D2E | | | 4.7160E-04 |
| | D4E | | | -6.4930E-07 |
| | D6E | | | 2.9390E-10 |
| | D8E | | | -9.1385E-16 |
| | D10E | | | -2.4537E-17 |
| | D2S | | | 4.3627E-04 |
| | D4S | | | -6.1710E-07 |
| | D6S | | | 2.7131E-10 |
| | D8S | | | -8.1699E-17 |
| | D10S | | | -2.0247E-17 |

R1 SURFACE  R2 SURFACE

R1 SURFACE  R2 SURFACE

OPTICAL SCANNING APPARATUS INCLUDING A LENS HAVING ASPHERICAL SURFACES ON BOTH SIDES

BACKGROUND OF THE INVENTION

1. Field of the Invention

The present invention relates to optical scanning apparatuses, and more particularly, to an optical scanning apparatus best suited to, for example, a laser beam printer (LBP) apparatus and a digital copying machine having an electrophotographic process, wherein luminous flux optically modulated and emitted from light source means is deflected and reflected with an optical deflector including a polygon mirror, and then moves in rapid succession on a plane to be scanned through an image optical system having an $f_\theta$ characteristics ($f_\theta$ lens) in order to record image information.

2. Description of the Related Art

In a conventional optical scanning apparatus used for a laser beam printer apparatus, luminous flux optically modulated and emitted from a light source according to an image signal is periodically deflected with an optical deflector including, for example, a polygon mirror, and then is converged on a surface of a photosensitive recording medium (photosensitive drum) in a spot shape with an image optical system having $f_\theta$ characteristics. The surface is optically scanned to record images.

FIG. 1 is an outlined cross section in the main scanning direction of the main section of a conventional optical scanning apparatus.

As shown in FIG. 1, divergent luminous flux emitted from light source means 11 is made almost parallel with a collimator lens 12, is restricted in terms of light energy by an aperture 13, and then is input to a cylindrical lens 14 having a certain refractive power only in the sub-scanning direction. The parallel luminous flux input to the cylindrical lens 14 is output in the main scanning cross section as is, and is converged in the sub-scanning cross section to form almost a line image on the deflection surface (reflection surface) 15a of the optical deflector comprising a polygon mirror.

Luminous flux deflected and reflected with the deflection surface 15a of the optical deflector 15 is directed to the surface of a photosensitive drum 18 serving as a plane to be scanned, through an image optical system ($f_\theta$ lens) 16 having $f_\theta$ characteristics. As the optical deflector 15 is rotated in the direction indicated by arrow A, the surface of the photosensitive drum 18 is optically scanned and image information is recorded.

To very precisely record image information in such an optical scanning apparatus, it is required that, over all of the plane to be scanned, field curvature is successfully compensated for, the spot diameter is uniform, and distortion aberration ($f_\theta$ characteristics) which has a proportional relationship between the angle of incident light and image height is provided. Various optical scanning apparatuses having these optical features or their compensation optical systems ($f_\theta$ characteristics) have been proposed.

As laser beam printers and digital copying machines have been made compact and inexpensive, optical scanning apparatuses are required to be made the same.

Various optical scanning apparatus comprising one $f_\theta$ lens, which satisfy the demands for satisfactorily compensating for field curvature and for providing $f_\theta$ characteristics, have been proposed, such as those disclosed in Japanese Examined Patent Publication No. 61-48684, Japanese Unexamined Patent Publication No. 63-157122, Japanese Unexamined Patent Publication No. 4-104213, and Japanese Unexamined Patent Publication No. 4-50908 (corresponding to U.S. Pat. No. 5,111,219).

In Japanese Examined Patent Publication No. 61-48684 and Japanese Unexamined Patent Publication No. 63-157122, a single lens having a concave surface facing an optical deflector is used as an $f_\theta$ lens to converge parallel luminous flux from a collimator lens on a surface of a recording medium. In Japanese Unexamined Patent Publication No. 4-104213, a single lens having a concave surface facing an optical deflector and a toroidal surface facing an image plane is used as an $f_\theta$ lens. Luminous flux converted to converged luminous flux by a collimator lens is input to the $f_\theta$ lens. In Japanese Unexamined Patent Publication No. 4-50908, a single lens having high-order aspherical surfaces is used as an $f_\theta$ lens. Luminous flux converted to converged luminous flux by a collimator lens is input to the $f_\theta$ lens.

However, the optical scanning apparatus disclosed in Japanese Examined Patent Publication No. 61-48684 still has field curvature in the sub-scanning direction. The apparatus also has a long focal length f, which is equal to the distance from the $f_\theta$ lens to the plane to be scanned, because parallel luminous flux forms an image on the plane to be scanned, making it difficult to configure a compact optical scanning apparatus.

Since the optical scanning apparatus disclosed in Japanese Unexamined Patent Publication No. 63-157122 has an $f_\theta$ lens with a thick wall, it is difficult to mold the lens, thereby increasing the cost.

The optical scanning apparatus disclosed in Japanese Unexamined Patent Publication No. 4-104213 still has distortion aberration and jitter depending on the polygon surfaces due to an error in mounting the polygon mirror, which serves as an optical deflector.

The optical scanning apparatus disclosed in Japanese Unexamined Patent Publication No. 4-50908 has a high-order aspherical $f_\theta$ lens to successfully compensate for aberrations. However, the spot diameter in the sub-scanning direction tends to change according to the height of an image because of uneven magnification in the sub-scanning direction between the optical deflector and the plane to be scanned.

SUMMARY OF THE INVENTION

Accordingly, it is an object of the present invention to provide a compact optical scanning apparatus which compensates for field curvature and distortion aberration, prevents jitter caused by an error in mounting an optical deflector and changes in a spot diameter in the sub-scanning direction according to the height of an image, and is suited to high-resolution printing by appropriately configuring the shape of an $f_\theta$ lens for cases in which converged luminous flux from a collimator lens forms an image on a plane to be scanned with the $f_\theta$ lens through the optical deflector.

The above object of the present invention is achieved through the provision of an optical scanning apparatus including a light source; a first optical system for converting luminous flux emitted from the light source to converged luminous flux; a deflector for deflecting the converged luminous flux emitted from the first optical system; and a second optical system for forming an image in a spot shape on a plane to be scanned from the converged luminous flux deflected by the deflector, wherein the second optical system comprises a single lens, both surfaces of the single lens being aspherical on the main scanning plane, and the following conditions are satisfied, with $R_1$ denoting the paraxial curvature radius of the lens surface facing the deflector of the single lens, $R_2$ denoting the paraxial curvature radius of the lens surface facing the plane to be scanned of the single lens, $Y_{max}$ denoting the maximum effective diameter on the main scanning plane of the single lens, $S_1$ denoting an aspherical-surface amount from the paraxial lens surface of the lens surface facing the deflector at the maximum effective diameter $Y_{max}$, $S_2$ denoting an aspherical-surface amount from the paraxial lens surface of the lens surface facing the plane to be scanned at the maximum effective diameter $Y_{max}$, and d denoting the center thickness of the single lens:

$$0 < R_1 < R_2$$

$$(R_1^2 - Y_{max}^2)^{1/2} - R_1 < S_1 < 0$$

$$(R_2^2 - Y_{max}^2)^{1/2} - R_2 - d < S_2 < (R_2^2 - Y_{max}^2)^{1/2} - R_2.$$

In the optical scanning apparatus, the following expression may also be satisfied, with $f_t$ denoting the focal length on the main scanning plane of the single lens and $S_k$ denoting the distance from the single lens to the plane to be scanned:

$0.2 \leq 1 - S_k/f_t \leq 0.5$.

In the optical scanning apparatus, the single lens may have toric, aspherical lens surfaces on both sides.

The optical scanning apparatus may include a third optical system disposed between the first optical system and the deflector, the third optical system having refractive power only in the sub-scanning direction and forming a line-shaped, longitudinal image in the main scanning direction on the deflection plane of the deflector from luminous flux emitted from the first optical system.

In the optical scanning apparatus, the first optical system may convert luminous flux emitted from the light source to converged luminous flux on the main scanning plane.

In the optical scanning apparatus, the curvature on the sub-scanning plane of at least one lens surface of both surfaces of the single lens may change successively within the effective range of the single lens.

In the optical scanning apparatus, the symmetrical axis of the second optical system in the main scanning direction may be slanted against the normal of the plane to be scanned on the main scanning plane.

In the optical scanning apparatus, the second optical system may be molded in plastic.

In the optical scanning apparatus, the second optical system may be molded in glass.

BRIEF DESCRIPTION OF THE DRAWINGS

FIG. 8 shows aspherical-surface coefficients of the $f_\theta$ lens and data for the optical arrangement in the first embodiment of the present invention.

FIG. 9 shows aspherical-surface coefficients of the $f_\theta$ lens and data for the optical arrangement in the first embodiment of the present invention.

DETAILED DESCRIPTION OF THE PREFERRED EMBODIMENTS

Figure 1:
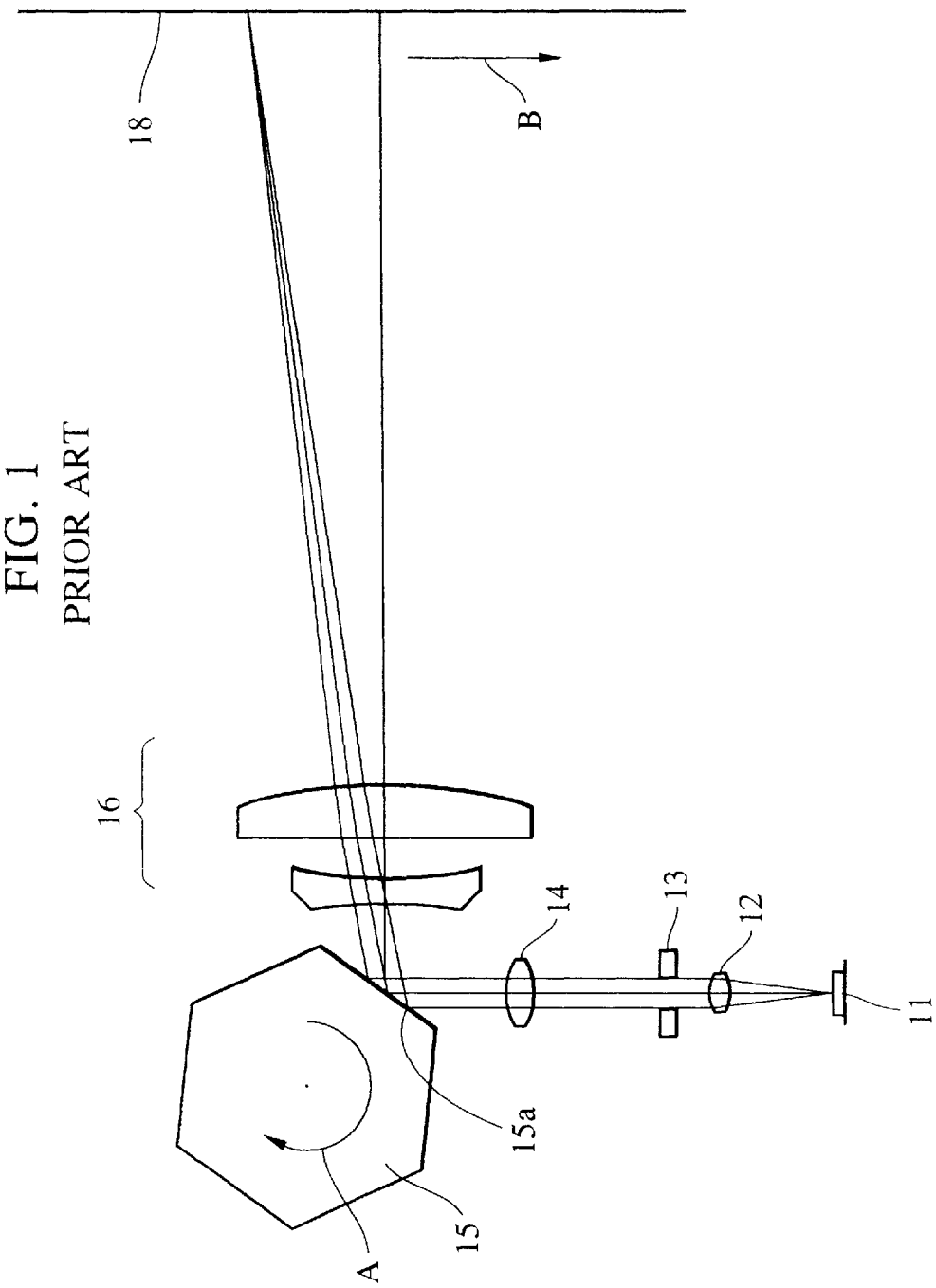
FIG. 1 is a general view showing the main section of the optical system of a conventional optical scanning apparatus.
Figure 2:
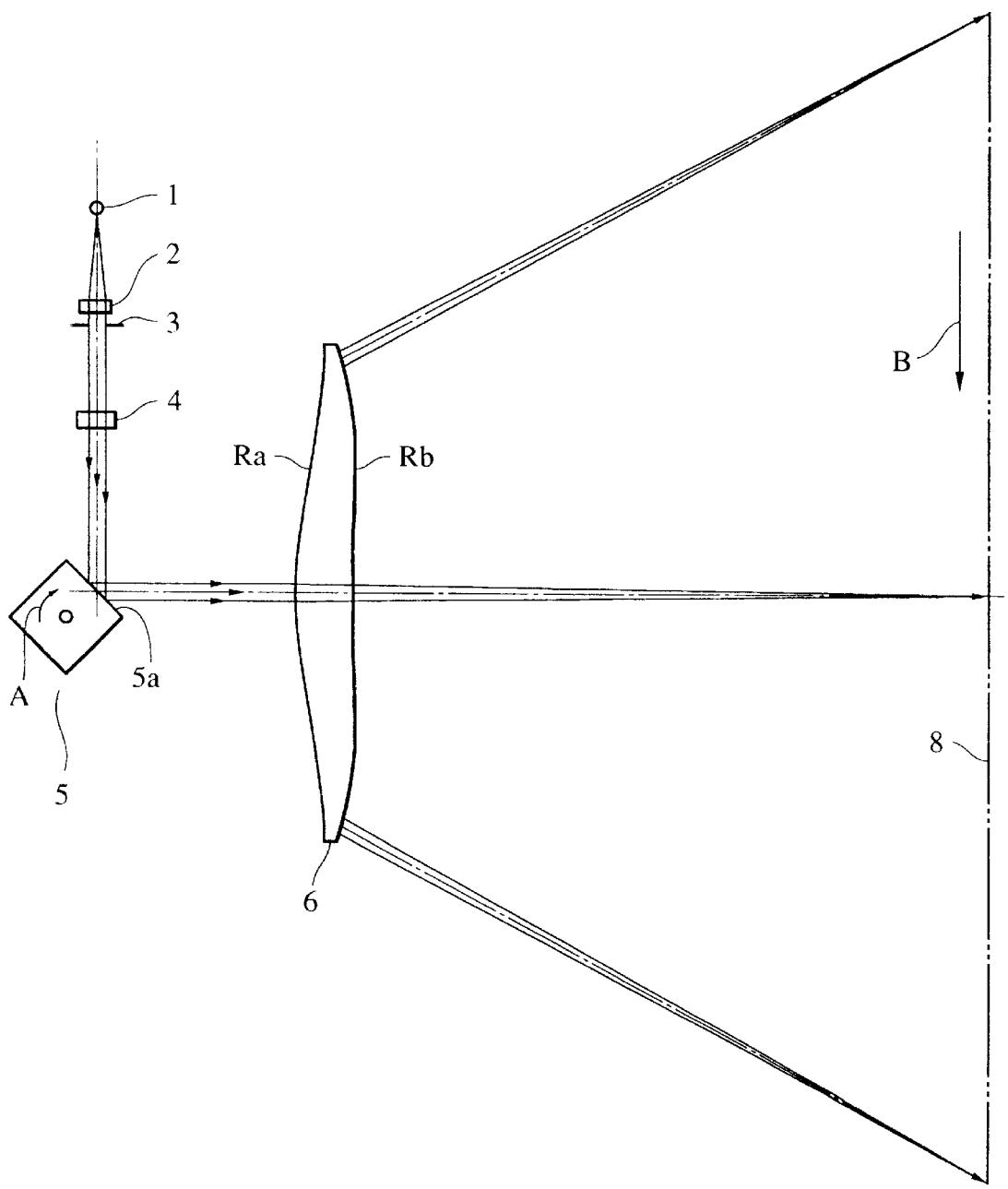
FIG. 2 is a cross section of the main section in the main scanning direction of an optical scanning apparatus according to a first embodiment of the present invention.
Figure 3:
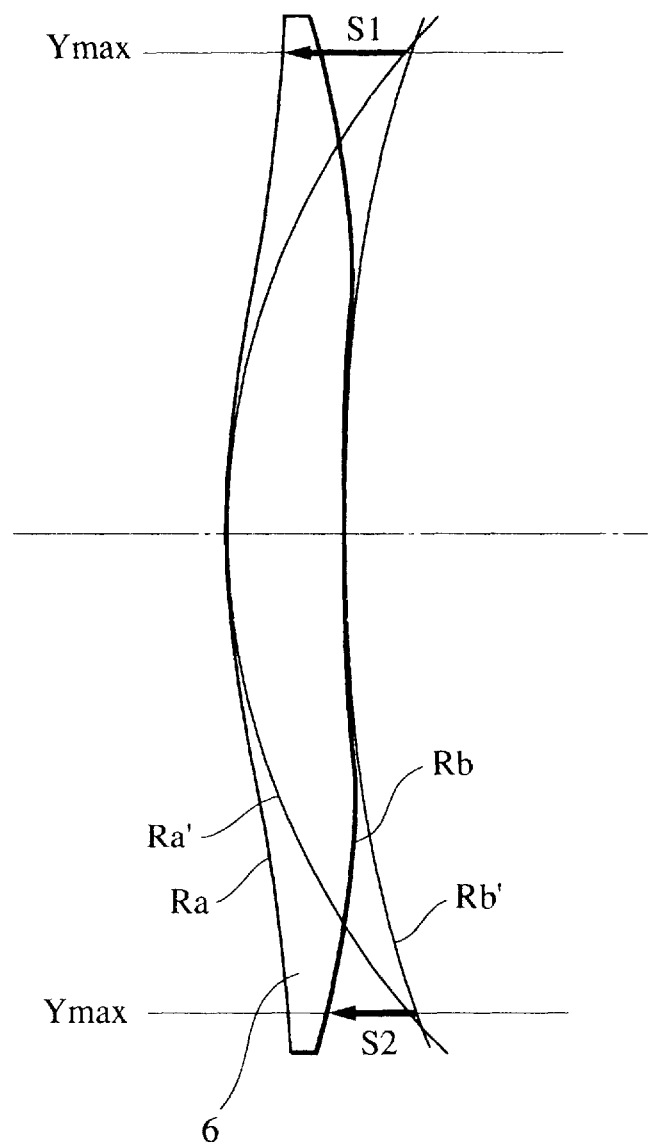
FIG. 3 is an enlarged view of the $f_\theta$ lens shown in FIG. 2.

FIG. 2 is a sectional view along the main scanning direction illustrating the main section of an optical scanning apparatus according to a first embodiment of the present invention. FIG. 3 is an enlarged view of the $f_\theta$ lens shown in FIG. 2. The main scanning direction refers to the direction in which a deflection-reflection surface of an optical deflector is deflection-scanned with luminous flux. The main scanning plane means the luminous-flux plane formed as time passes with luminous flux that is used for deflection-scanning on the deflection-reflection surface of the optical deflector.

In FIG. 2, there are shown light source means 1, such as that comprising a semiconductor laser, a collimator lens 2 serving as a first optical device, which converts luminous flux (optical beam) emitted from the light source means 1 to converged luminous flux on the main scanning plane, and an aperture stop 3 for arranging the diameter of luminous flux passing through it.

There is also shown a cylindrical lens 4 serving as a third optical device, which has a specified refractive power along the sub-scanning direction (the direction perpendicular to FIG. 2). Almost a line image is formed on a deflection-reflection plane 5a of the optical deflector 5 (described later) in the sub-scanning cross section with luminous flux passing through the aperture stop 3. Therefore, luminous flux input to the optical deflector 5 forms a longitudinal, line image in the main scanning direction.

The optical deflector 5 serving as a deflection device and comprising, for example, a polygon mirror rotates at a constant speed in the direction indicated with arrow A by driving means (not shown) such as a motor.

An $f_\theta$ lens 6 (image optical system) comprising one lens having the $f_\theta$ characteristics serving as a second optical device has, as described later, a lens surface Ra facing the optical deflector 5 (at the side to which luminous flux is input) and a lens surface Rb facing the plane to be scanned (at the side from which luminous flux is output), both of which are aspheric, toric surfaces in the main scanning plane. The lens 6 forms an image on a photosensitive drum 8, which is a recording medium and serving as a plane to be scanned, with luminous flux deflected and reflected by the optical deflector 5 according to image information. The lens 6 also compensates for inclination of the deflection plane of the optical deflector 5.

Curvature of the sub-scanning plane (plane including the optical axis of the $f_\theta$ lens 6 and perpendicular to the main scanning plane) of at least one of both lens surfaces Ra and Rb of the $f_\theta$ lens 6 of the present embodiment changes successively in the effective range of the lens, compensating for field curvature in the sub-scanning direction satisfactorily.

The symmetrical axis in the main scanning direction of the $f_\theta$ lens 6 is slanted against the normal line of the plane 8 to be scanned (photosensitive drum surface) on the main scanning plane, compensating for the $f_\theta$ characteristics successfully.

In this embodiment, the $f_\theta$ lens 6 may be molded in plastic. Alternatively, it may be molded in glass.

In the present embodiment, luminous flux emitted from the semiconductor laser 1 is converted to the converged luminous flux on the main scanning plane by the collimator lens 2. The luminous flux (luminous energy) is restricted by the aperture stop 3, and is input to the cylindrical lens 4. This incident luminous flux is emitted as is on the main scanning cross section and is converged on the sub scanning cross section which includes the optical axis and is perpendicular to the main scanning cross section, forming a line image (longitudinal, line image in the main scanning direction) on the deflection plane 5a of the optical deflector. The luminous flux deflected and reflected on the deflection plane 5a of the optical deflector 5 reaches the photosensitive drum 8 through the $f_\theta$ lens 6. As the optical deflector 5 rotates in the direction indicated by arrow A, the photosensitive drum 8 is optically scanned in the direction indicated by arrow B in order to record images.

Means for compensating for distortion aberration ($f_\theta$ characteristics) and field curvature, according to the present embodiment will be described below. Since luminous flux incident to the $f_\theta$ lens 6 from the collimator lens 2 through the optical deflector 5 is a converged flux on the main scanning plane, the following condition is required to be satisfied in order to meet the $f_\theta$ characteristics of the apparatus:

$$0<R_1<R_2 \quad (1)$$

where $R_1$ and $R_2$ are paraxial curvature radii of the $f_\theta$ lens 6 in positional order from the optical deflector on the main scanning plane.

This means that the lens surface Ra, which faces the optical deflector 5 of the $f_\theta$ lens 6, has a convex meniscus shape in the vicinity of the optical axis, and both lens surface Ra and lens surface Rb, which faces the plane to be scanned, have an aspherical shape. In order to make the spot diameter according to the image height the same in the sub-scanning direction, the lens shape is determined such that the aspherical shape satisfies the following conditions:

$$(R_1^2-Y_{max}^2)^{1/2}-R_1<S_1<0 \quad (2)$$
$$(R_2^2-Y_{max}^2)^{1/2}-R_2-d<S_2<(R_2^2-Y_{max}^2)^{1/2}-R_2 \quad (3)$$

where Ymax is the maximum effective diameter on the main scanning plane, $S_1$ and $S_2$ are the aspherical-surface amounts from the paraxial lens surface R at the maximum effective diameter $Y_{max}$, and d is the center thickness of the $f_\theta$ lens 6. $Y_{max}$ is a distance from the optical axis of the $f_\theta$ lens 6 to the position where the outermost ray of the luminous flux passes.

This is because variation of the F number in the sub-scanning direction according to the image height, namely, variation of the main plane position in the sub-scanning direction, needs to be restricted in order to make the spot diameter according to the image height the same in the sub-scanning direction since the spot diameter $\rho_s$ in the sub-scanning direction is generally described as below. In other words, the image magnification in the sub-scanning direction needs to be made uniform.

$$\rho_s=c\lambda F_s$$

where $F_s$ is the F number in the sub-scanning direction, $\lambda$ is the wavelength of the ray used, and c is the constant.

If conditional expression (1) is not satisfied, it becomes difficult to compensate for field curvature, distortion aberration, and so on successfully. If either of conditional expressions (2) and (3) is not satisfied, it becomes difficult to make the spot diameter in the sub-scanning direction the same.

In this embodiment, the shape of the $f_\theta$ lens 6 is configured such that conditional expressions (1), (2), and (3) are satisfied, maintaining field curvature, distortion aberration, and so on at appropriate values and improving the uniformity of the spot diameter in the sub-scanning direction.

Figure 4:
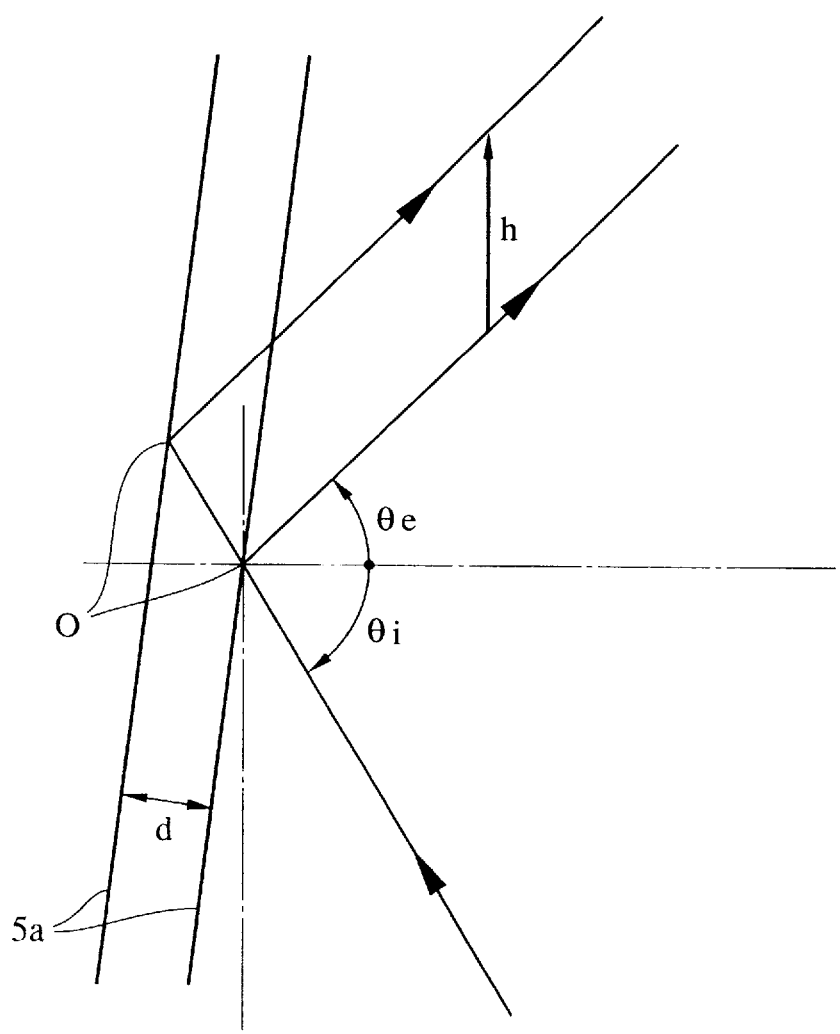
FIG. 4 is an enlarged view of a part of the optical deflector shown in FIG. 2.
Figure 5:
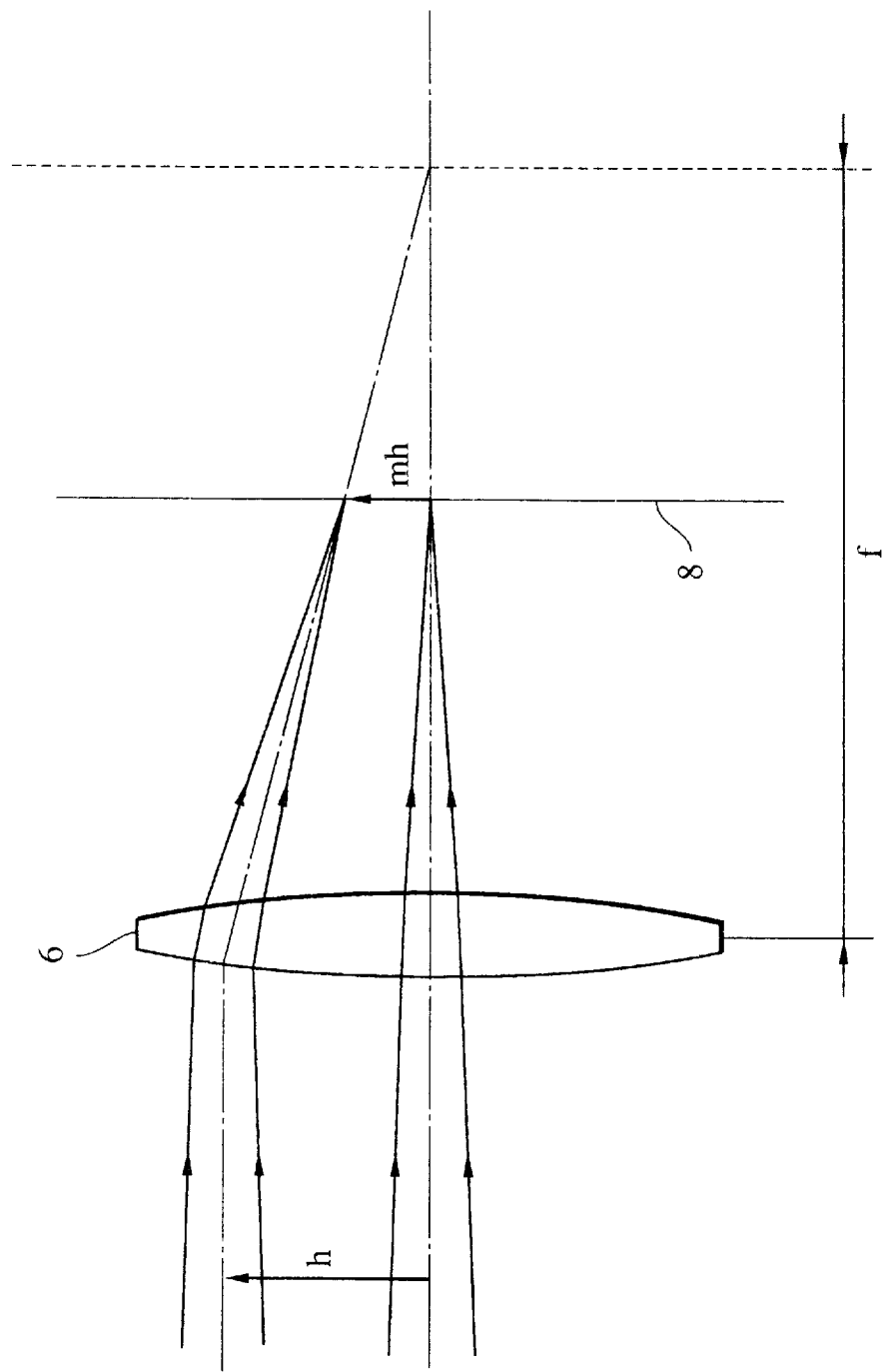
FIG. 5 is a view showing correlation between jitter and a shift between two bundles of luminous flux according to the first embodiment of the present invention.
Figure 6:
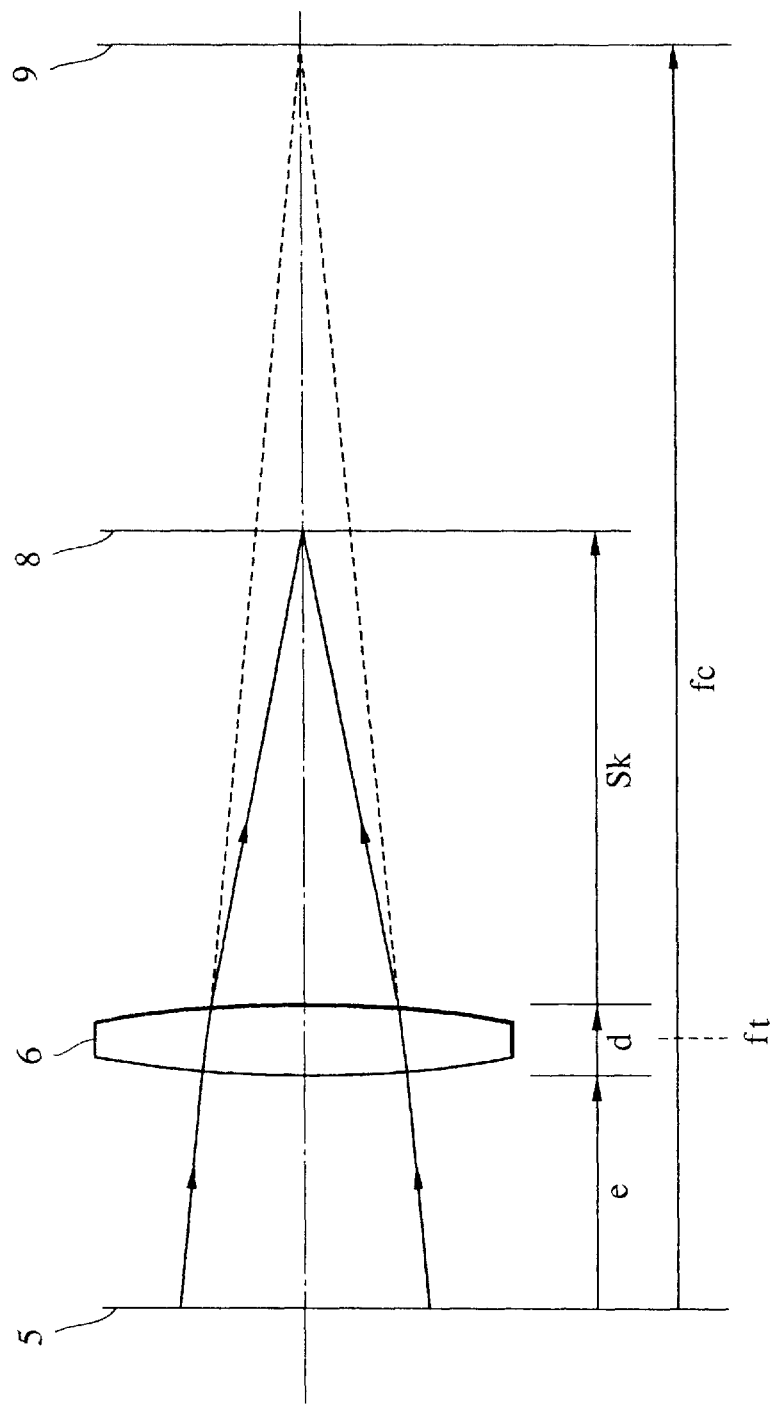
FIG. 6 is a view illustrating the positional relationship in the area from the optical deflector to the plane to be scanned according to the first embodiment of the present invention.

Next, by referring to FIGS. 4 to 6, means for reducing jitter caused by the optical deflector (polygon mirror). These figures are views on the main scanning plane.

When a polygon mirror is used for deflecting luminous flux with the same deflection angle as shown in FIG. 4, the deflection point changes its position back and forth depending on the polygon surface used due to an error caused by engagement with a motor rotation shaft and distance variation from the rotation center to the polygon surface (deflection and reflection surface). When luminous flux deflected at the polygon surface 5a of the polygon mirror 5 and incident to the $f_\theta$ lens 6 is parallel, the luminous flux forms the image at the same point on the photosensitive drum, which is the image plane.

When luminous flux output from the collimator lens has already been converged, however, the luminous flux does not form an image on the same point on the photosensitive drum, causing jitter depending on polygon-mirror surfaces and deteriorating the image.

As shown in FIG. 5, the amount of jitter J is expressed by the following expression:

J=mh where h is a shift between two bundles of luminous flux deflected at different polygon surfaces, and m is the transverse magnification in the main scanning direction.

The transverse magnification m is shown in the following expression:

$$m=1-S_k/f_t$$

where $f_t$ is the focal length of the $f_\theta$ lens 6 in the main scanning direction (on the main scanning plane) as shown in FIG. 6, and $S_k$ is a distance from the $f_\theta$ lens 6 (luminous-flux emitting plane of the $f_\theta$ lens 6) to the plane 8 to be scanned (photosensitive drum plane).

Therefore the amount of jitter can be expressed as follows:

$$J=(1-S_k/f_t)h$$

As shown in FIG. 4, the shift h between the two bundles of luminous flux is determined by the incident angle $\theta_i$ of the luminous flux on the polygon surface, the output angle $\theta_e$ from the polygon surface, and the quantity d of eccentricity on the polygon surface. It can be expressed in the following expression.

$$h=(d\sin(\theta_e-\theta_i))/(\cos\theta_e \cos((\theta_e-\theta_i)/2))=d\times g(\theta_i, \theta_e)$$

Since the above described parameters fall in a limited range, the shift h ranges from 0.02 to 0.04.

Generally, jitter becomes noticeable for eyes when the distance between two dots on an image shift half or more of a dot. In an optical scanning apparatus used for a laser beam printer having a resolution of 600 dpi, for example, jitter becomes noticeable when the amount of jitter reaches the following value or more.

$$J=25.4/600/2=0.02 \text{ mm}$$

Therefore, in order to form a high-quality image, the transverse magnification m in the main scanning direction shall be limited to 0.5 or less according to the following expressions.

---

J = mh
$0.02 \geq m \times 0.04$
$m \leq 0.5$

---

If the transverse magnification m in the main scanning direction becomes small, however, the distance $S_k$ between the $f_\theta$ lens 6 and the plane 8 to be scanned becomes long, so that the apparatus cannot be made compact. To meet these two opposing conditions, the refractive power of the $f_\theta$ lens 6 and that of the collimator lens 2 are determined such that the transverse magnification m in the main scanning direction satisfies the following condition, allowing a compact optical scanning apparatus having reduced jitter caused by an error in mounting the polygon mirror (optical deflector) 5 to be implemented:

$$0.2 \leq m \leq 0.5$$

Namely, $$0.2 \leq 1-S_k/f_t \leq 0.5. \quad (4)$$

In FIG. 6, there are shown a plane 9 on which luminous flux is converged when the $f_\theta$ lens 6 is not used, a distance $f_c$ from the optical deflector 5 to the virtual convergence plane 9, and a distance e from the optical deflector 5 to the $f_\theta$ lens 6 (plane to which luminous flux is incident of the $f_\theta$ lens 6).

If the upper limit of the conditional expression (4) is exceeded, jitter becomes noticeable, deteriorating the quality an image. If the value is below the lower limit of the expression (4), the distance between the $f_\theta$ lens 6 and the plane 8 to be scanned becomes long, making the apparatus large.

In this embodiment, the $f_\theta$ lens 6 is configured with an aspherical surface being expressed by a function having up to a term of tenth degree in the main scanning direction and a spherical surface changing successively in the height direction of an image in the sub-scanning direction. When the intersection between the $f_\theta$ lens 6 and the optical axis is set to the origin and the optical axis is assumed to be the X-axis, the axis perpendicular to the optical axis on the main scanning plane the Y-axis, and the axis perpendicular to the optical axis on the sub- scanning plane the Z-axis, for example, the shape of the lens in the generating-line direction corresponding to the main scanning direction can be expressed by the following expression.

$$X=(Y^2/R)/(1+(1-(1+K)(Y/R)^2)^{1/2})=B_4Y^4+B_6Y^6+B_8Y^8+B_{10}Y^{10}$$

where R is curvature radius and K, $B_4$, $B_6$, $B_8$, and $B_{10}$ are aspherical-surface coefficients. The shape of the lens in the meridian-line direction corresponding to the sub-scanning direction (direction perpendicular to the main scanning direction including the optical axis) can be expressed as follows:

$$S=(Z^2/r')/(1+(1-(Z/r')^2)^{1/2})$$

where $$r'=r(1+D_2Y^2+D_4Y^4+D_6Y^6+D_8Y^8+D_{10}Y^{10}).$$

Figure 10:
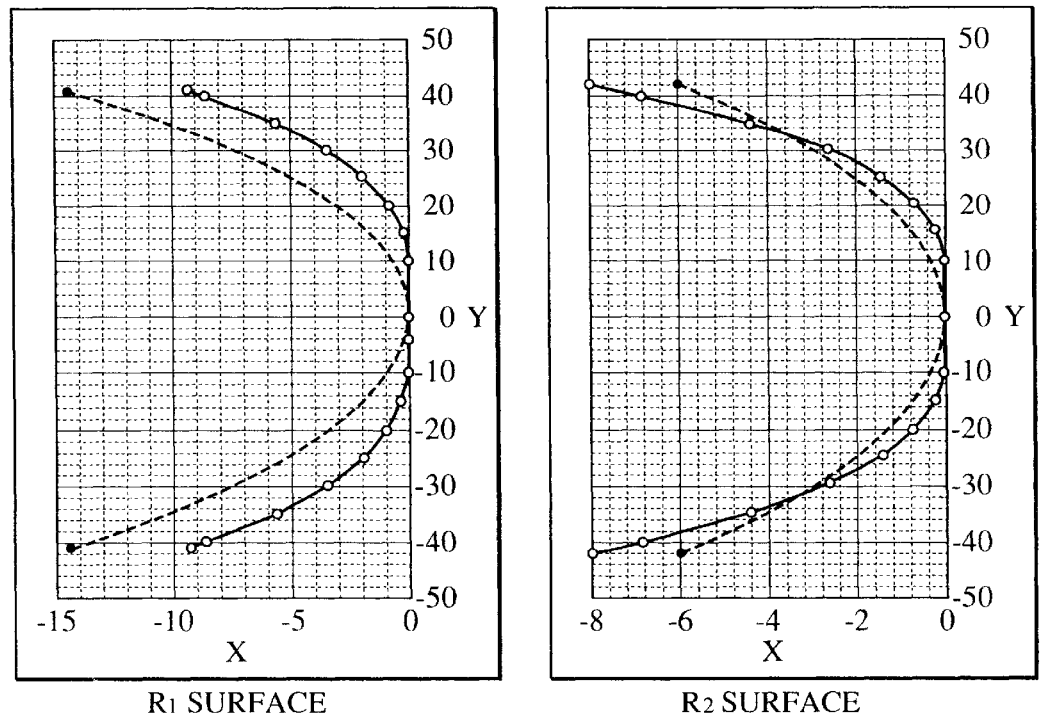
FIG. 10 illustrates the shapes of the aspherical surfaces of the $f_\theta$ lens according to the first embodiment of the present invention.

FIG. 8 shows the optical arrangement and the aspherical-surface coefficients of the $f_\theta$ lens 6 according to the first embodiment of the present invention. FIG. 10 illustrates the shapes of the aspherical surfaces of the $f_\theta$ lens 6. In FIG. 10, thick lines indicate aspherical-surface amounts S from the paraxial curvature radius and dotted lines indicate the values of $(R^2-Y_{max}^2)^{1/2}-R$.

In the first embodiment, the center thickness d, the paraxial curvature radius R, the aspherical-surface amount S, and the values of $(R^2-Y_{max}^2)^{1/2}-R$ of the $f_\theta$ lens 6 are described below which satisfy the conditional expressions (1) to (3).

---

$R_1 = 65.22$
$R_2 = 150.03$
$d = 10$
$S_1 = -9.44$
$S_2 = -7.97$
$(R_1^2 - Y_{max}^2)^{1/2} - R_1 = -14.50$
$(R_2^2 - Y_{max}^2)^{1/2} - R_2 = -6.00$

---

Figure 12:
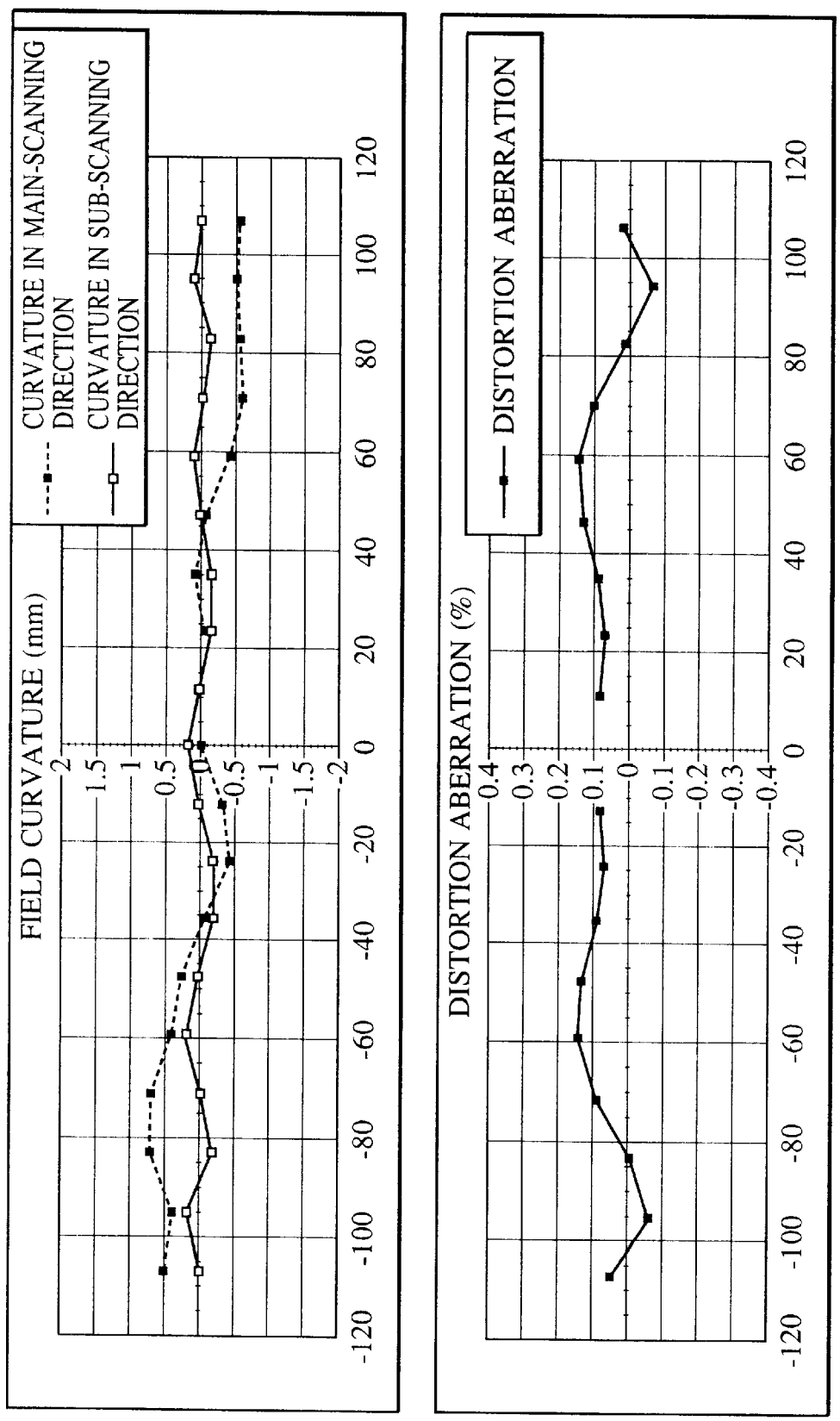
FIG. 12 illustrates field curvature and distortion aberration according to the first embodiment of the present invention.

FIG. 12 is an aberration view showing field curvature and distortion aberration in the first embodiment. It is understood from this figure that the aberrations have been compensated for to the level at which there is no practical problem. Changes in the spot diameter in the sub-scanning direction due to the image height can also be restricted to 10 μm or less.

In the first embodiment, the focal length $f_t$ of the $f_\theta$ lens 6 in the main scanning direction is set to 213.7 mm, the distance $S_k$ from the $f_\theta$ lens 6 (plane from which luminous flux is output of the $f_\theta$ lens 6) to the plane 8 to be scanned (photosensitive drum surface) 111.5 mm, and the transverse magnification m in the main scanning direction 0.478 as described below in order to satisfy the conditional expression (4). This reduces jitter caused by an error in mounting the polygon mirror (optical deflector).

$$m=1-S_k/f_t=1-111.5/213.7=0.478$$

Since the shift h between the two bundles of luminous flux in the present embodiment has the following value when the incident angle $\theta_t$ of the flux to the polygon plane 5a is −90 degrees, the output angle $\theta_e$ of the flux is 45 degrees, and the quantity d of eccentricity on the polygon plane 5a is 15 μm, the jitter amount J has the value described below.

$$h=(d\sin(\theta_e-\theta_t))/(\cos\theta_e \cos((\theta_e-\theta_t)/2))=0.039 \text{ mm}$$

J=mh=0.0186 mm

Thus, jitter can be restricted to the level at which it is not noticeable to the eye.

As described above, the shape and optical arrangement of the $f_\theta$ lens 6 is appropriately configured in the present embodiment so that field curvature and distortion aberration are successfully compensated for and problems related to jitter caused by an error in mounting the optical deflector and related to changes in the spot diameter in the sub-scanning direction according to the image height are solved when converged light from the collimator lens forms an image on the plane to be scanned with one $f_\theta$ lens through the optical deflector.

Figure 7:
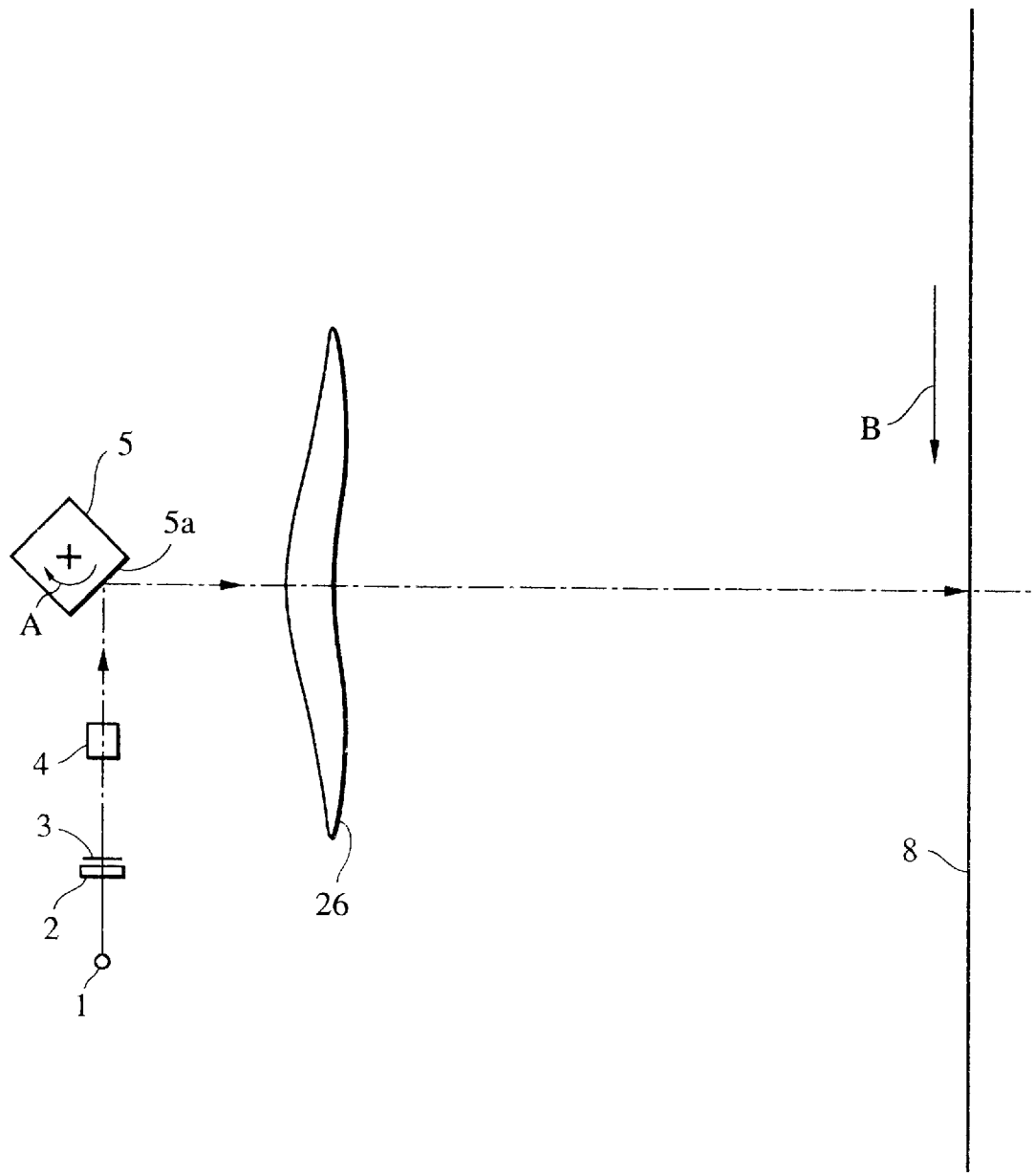
FIG. 7 is a cross section of the main section in the main-scanning direction of an optical scanning apparatus according to a second embodiment of the present invention.

FIG. 7 shows a cross section (main-scanning cross section) of the main section of the optical system in the main scanning direction of an optical scanning apparatus according to a second embodiment of the present invention. In FIG. 7, the same elements as those shown in FIG. 2 have the same symbols.

The present embodiment differs from the first embodiment, described above, in that a $f_\theta$ lens 26 having a thinner center thickness in the optical-axis direction than the $f_\theta$ lens 6. Other configurations and optical operation are almost the same.

Figure 11:
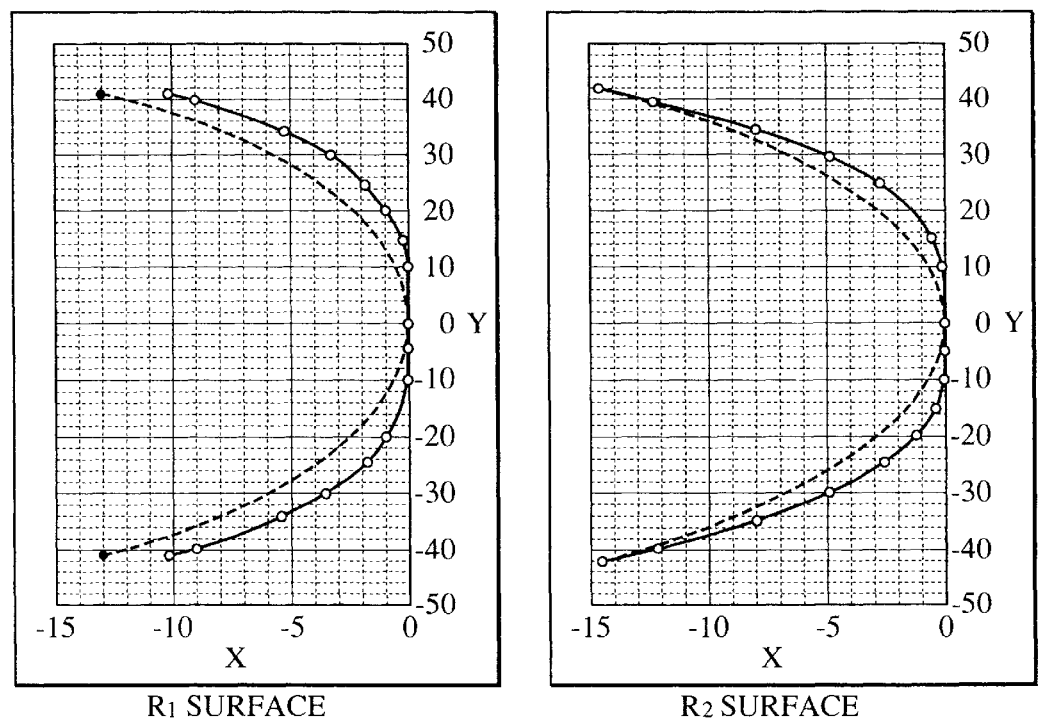
FIG. 11 illustrates the shapes of the aspherical surfaces of the $f_\theta$ lens according to the second embodiment of the present invention.

FIG. 9 shows the optical arrangement and the aspherical-surface coefficients of the $f_\theta$ lens 26 according to the second embodiment of the present invention. FIG. 11 illustrates the aspherical-surface amounts of the $f_\theta$ lens 26. In FIG. 11, thick lines indicate an aspherical-surface amount S from the paraxial curvature radius and dotted lines indicate the values of $(R_2-Y_{max}^2)^{1/2}-R$.

In the second embodiment, the center thickness d, the paraxial curvature radius R, the aspherical-surface amount S, and the values of $(R_2-Y_{max}^2)^{1/2}-R$ of the $f_\theta$ lens 26 are described below and they satisfy the conditional expressions (1) to (3).

Figure 13:
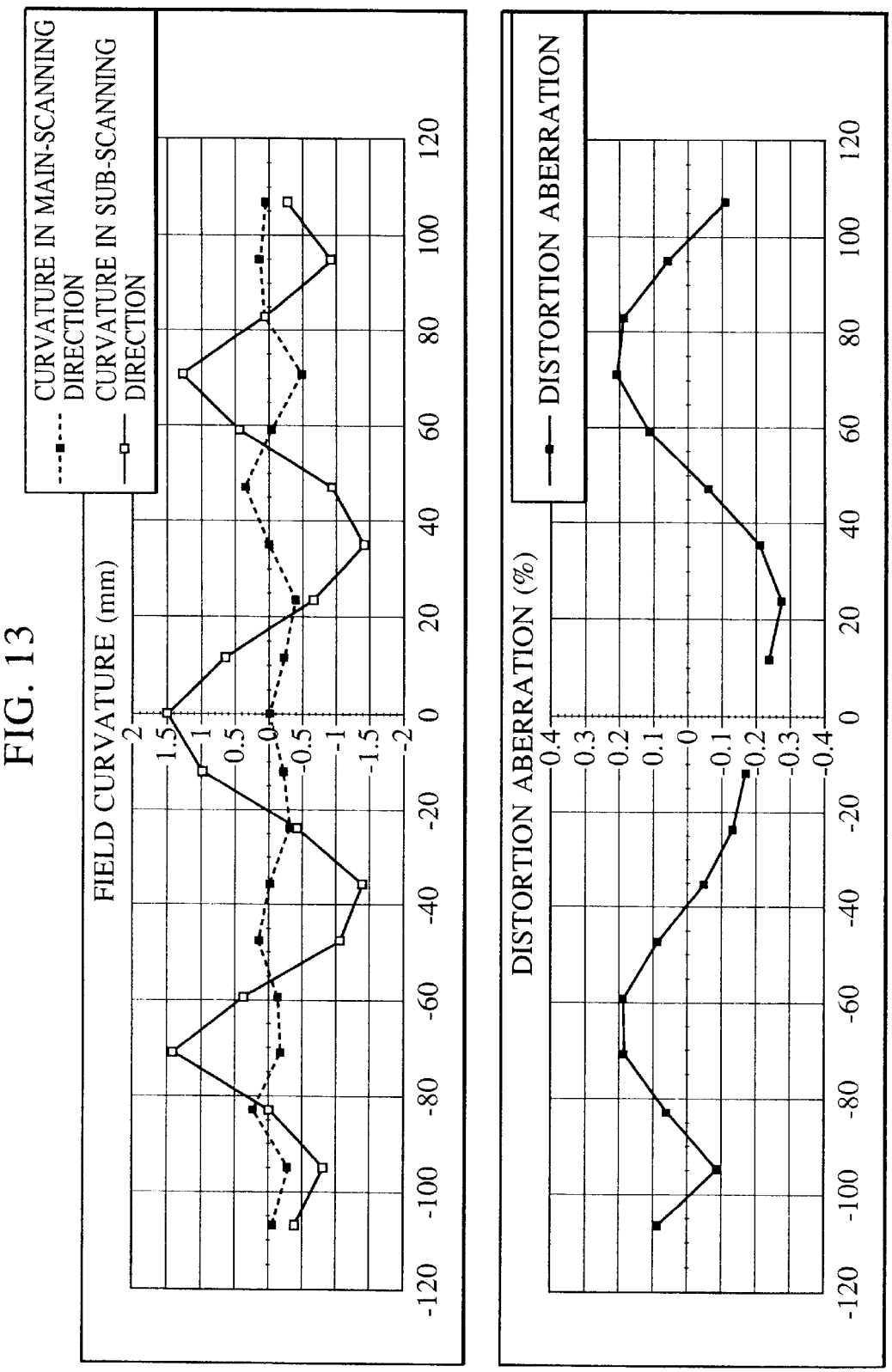
FIG. 13 illustrates field curvature and distortion aberration according to the second embodiment of the present invention.

$R_1 = 45.16$
$R_2 = 68.96$
$d = 8$
$S_1 = -20.24$
$S_2 = -14.61$
$(R_1^2 - Y_{max}^2)^{1/2} - R_1 = -26.23$
$(R_2^2 - Y_{max}^2)^{1/2} - R_2 = -14.27$ FIG. 13 is an aberration view showing field curvature and distortion aberration of the second embodiment. It is understood from this figure that the aberrations have been compensated for to the level at which there is no practical problem. Changes in the spot diameter in the sub-scanning direction due to the image height can also be restricted to 10 μm or less.

In the second embodiment, when the focal length $f_t$ of the $f_\theta$ lens 26 in the main scanning direction is set to 226.0 mm, and the distance $S_k$ from the $f_\theta$ lens 26 (plane where luminous flux is output from the $f_\theta$ lens 26) to the plane 8 to be scanned (photosensitive drum surface) is set to 111.5 mm, the transverse magnification m is as described below.

$m = 1 - S_k/f_t = 1 - 111.5/226.0 = 0.493$

This value satisfies the conditional expression (4) as in the first embodiment, and jitter caused by an error in mounting the optical deflector (polygon mirror) is restricted to a level at which it is not noticeable to the eye.

As described above, the shape and optical arrangement of the $f_\theta$ lens 26 is appropriately configured in the present embodiment so that field curvature and distortion aberration are successfully compensated for and problems related to jitter caused by an error in mounting the optical deflector and related to changes in the spot diameter in the sub-scanning direction according to the image height are solved, as described in the first embodiment.

According to the present invention, since the $f_\theta$ lens is configured such that its center thickness is thin in the optical-axis direction and its refractive power is restricted by inputting converged luminous flux to the $f_\theta$ lens, reducing the molding tact time for the $f_\theta$ lens and implementing the inexpensive optical scanning apparatus.

The distance $S_k$ from the $f_\theta$ lens to the plane to be scanned is restricted to less than the focal length $f_t$ of the $f_\theta$ lens in the present invention, implementing the compact optical scanning apparatus.

According to the present invention, the factors related to the $f_\theta$ lens 6, such as the paraxial curvature radius in the main scanning direction, aspherical-surface amount, focal length, and distance to the plane to be scanned, are appropriately set as described above when converged luminous flux from the collimator lens forms an image on the plane to be scanned with one $f_\theta$ lens through the optical deflector so that field curvature and distortion aberration are successfully compensated for and effects of jitter caused by an error in mounting the optical deflector and of changes in the spot diameter in the sub-scanning direction according to the image height are minimized, allowing the compact optical scanning apparatus suited to high-precision printing to be implemented.

What is claimed is:

1. An optical scanning apparatus comprising:
   a light source;
   a first optical system for converting luminous flux emitted from said light source to converged luminous flux;
   a deflector for deflecting the converged luminous flux emitted from said first optical system; and
   a second optical system for forming an image in a spot shape on a plane to be scanned from the converged luminous flux deflected by said deflector, wherein said second optical system comprises a single lens, both surfaces of said single lens being aspherical on the main scanning plane, and the following conditions being satisfied, with $R_1$ denoting the paraxial curvature radius of the lens surface facing said deflector of said single lens, $R_2$ denoting the paraxial curvature radius of the lens surface facing said plane to be scanned of said single lens, $Y_{max}$ denoting the maximum effective diameter on the main scanning plane of said single lens, $S_1$ denoting an aspherical-surface amount from the paraxial lens surface of the lens surface facing said deflector at said maximum effective diameter $Y_{max}$, $S_2$ denoting an aspherical-surface amount from the paraxial lens surface of the lens surface facing said plane to be scanned at said maximum effective diameter $Y_{max}$, and d denoting the center thickness of said single lens:

$$0 < R_1 < R_2$$

$$(R_1^2 - Y_{max}^2)^{1/2} - R_1 < S_1 < 0$$

$$(R_2^2 - Y_{max}^2)^{1/2} - R_2 - d < S_2 < (R_2^2 - Y_{max}^2)^{1/2} - R_2.$$

2. An optical scanning apparatus according to claim 1, wherein the following expression is satisfied, with $f_t$ denoting the focal length on the main scanning plane of said single lens and $S_k$ denoting the distance from said single lens to the plane to be scanned:

$0.2 \leq 1 - S_k/f_t \leq 0.5$.

3. An optical scanning apparatus according to claim 1, wherein said single lens has toric, aspherical lens surfaces on both sides.

4. An optical scanning apparatus according to claim 1, further comprising a third optical system disposed between said first optical system and said deflector, said third optical system having refractive power only in the sub-scanning direction and forming a longitudinal, line-shaped image in the main scanning direction on the deflection plane of said deflector from luminous flux emitted from said first optical system.

5. An optical scanning apparatus according to claim 1, wherein said first optical system converts luminous flux emitted from said light source to the converged luminous flux on the main scanning plane.

6. An optical scanning apparatus according to claim 1, wherein the curvature on the sub-scanning plane of at least one lens surface of both surfaces of said single lens changes successively within the effective range of said single lens.

7. An optical scanning apparatus according to claim 1, wherein the symmetrical axis of said second optical system in the main scanning direction is slanted against the normal of said plane to be scanned on the main scanning plane.

8. An optical scanning apparatus according to claim 1, wherein said second optical system is molded in plastic.

9. An optical scanning apparatus according to claim 1, wherein said second optical system is molded in glass.

10. A laser beam printer apparatus comprising:
a light source;
a first optical system for converting luminous flux emitted from said light source to the converged luminous flux;
a deflector for deflecting the converged luminous flux emitted from said first optical system;
a recording medium; and
a second optical system for forming an image in a spot shape on a surface of said recording medium from the converged luminous flux deflected by said deflector, wherein said second optical system comprises a single lens, both surfaces of said single lens being aspherical on the main scanning plane and the following conditions being satisfied, with $R_1$ denoting the paraxial curvature radius of the lens surface facing said deflector of said single lens, $R_2$ denoting the paraxial curvature radius of the lens surface facing said recording-medium surface of said single lens, $Y_{max}$ denoting the maximum effective diameter on the main scanning plane of said single lens, $S_1$ denoting an aspherical-surface amount from the paraxial lens surface of the lens surface facing said deflector at the maximum effective diameter $Y_{max}$, $S_2$ denoting an aspherical-surface amount from the paraxial lens surface of the lens surface facing said recording-medium surface at the maximum effective diameter $Y_{max}$, and d denoting the center thickness of said single lens:

$$O < R_1 < R_2$$

$$(R_1^2 - Y_{max}^2)^{1/2} - R_1 < S_1 < O$$

$$(R_2^2 - Y_{max}^2)^{1/2} - R_2 - d < S_2 < (R_2^2 - Y_{max}^2)^{1/2} - R_2.$$

11. A laser beam printer apparatus according to claim 10, wherein the following expression is satisfied, with $f_t$ denoting the focal length on the main scanning plane of said single lens and $S_k$ denoting the distance from said single lens to the surface of said recording-medium:

$$0.2 \leq 1 - S_k/f_t \leq 0.5.$$

12. A laser beam printer apparatus according to claim 10, wherein said single lens has toric, aspherical lens surfaces on both sides.

13. A laser beam printer apparatus according to claim 10, further comprising a third optical system disposed between said first optical system and said deflector, said third optical system having refractive power only in the sub-scanning direction and forming a longitudinal, line-shaped image in the main scanning direction on the deflection plane of said deflector from the converged luminous flux emitted from said first optical system.

14. A laser beam printer apparatus according to claim 10, wherein said first optical system converts luminous flux emitted from said light source to the converged luminous flux on the main scanning plane.

15. A laser beam printer apparatus according to claim 10, wherein the curvature on the sub-scanning plane of at least one lens surface of both surfaces of said single lens changes successively within the effective range of said single lens.

16. A laser beam printer apparatus according to claim 10, wherein the symmetrical axis of said second optical system in the main scanning direction is slanted against the normal of said recording-medium surface on the main scanning plane.

17. A laser beam printer apparatus according to claim 10, wherein said second optical system is molded in plastic.

18. A laser beam printer apparatus according to claim 10, wherein said second optical system is molded in glass.

19. A lens for scanning comprises a single lens, both surfaces of said single lens being aspherical on the main scanning plane and the following conditions being satisfied, with $R_1$ denoting the paraxial curvature radius of the lens surface where luminous flux is input to said single lens, $R_2$ denoting the paraxial curvature radius of the lens surface where luminous flux is output from said single lens, $Y_{max}$ denoting the maximum effective diameter on the main scanning plane of said single lens, $S_1$ denoting an aspherical-surface amount from the paraxial lens surface of said lens surface where luminous flux is input at the maximum effective diameter $Y_{max}$, $S_2$ denoting an aspherical-surface amount from the paraxial lens surface of said lens surface where luminous flux is output at the maximum effective diameter $Y_{max}$, and d denoting the center thickness of said single lens:

$$O < R_1 < R_2$$

$$(R_1^2 - Y_{max}^2)^{1/2} - R_1 < S_1 < O$$

$$(R_2^2 - Y_{max}^2)^{1/2} - R_2 - d < S_2 < (R_2^2 - Y_{max}^2)^{1/2} - R_2.$$

20. A lens for scanning according to claim 19, wherein said single lens has toric, aspherical lens surfaces on both sides.

21. A lens for scanning according to claim 19, wherein the curvature on the sub-scanning plane of at least one lens surface of both surfaces of said single lens changes successively within the effective range of said single lens.

22. A lens for scanning according to claim 19, wherein said lens for scanning is molded in plastic.

23. A lens for scanning according to claim 19, wherein said lens for scanning is molded in glass.

* * * * *

UNITED STATES PATENT AND TRADEMARK OFFICE
CERTIFICATE OF CORRECTION

PATENT NO. : 5,818,505

DATED : October 6, 1998

INVENTOR(S) : MANABU KATO

It is certified that error appears in the above-identified patent and that said Letters Patent is hereby corrected as shown below:

On the title page,

Item [56] FOREIGN PATENT DOCUMENTS:

"4104213" should read --4-104213--.

Item [57] Abstract:

Line 8, "lens." should read --lens, which has aspherical surfaces in the main scanning plane on both sides--.

COLUMN 1:

Line 16, "an" should be deleted;
    Line 36, "sub-scanning" should read --subscanning--;
    Line 39, "sub-scanning" should read --subscanning--; and
    Line 64, "apparatus" should read --apparatuses--.

COLUMN 2:

Line 22, "sub-scanning" should read --subscanning--;
    Line 40, "sub-scanning" should read --subscanning--;
    Line 42, "sub-scanning" should read --subscanning--; and
    Line 52, "sub-scanning" should read --subscanning--.

UNITED STATES PATENT AND TRADEMARK OFFICE
CERTIFICATE OF CORRECTION

PATENT NO. : 5,818,505

DATED : October 6, 1998

INVENTOR(S) : MANABU KATO

Page 2 of 4

It is certified that error appears in the above-identified patent and that said Letters Patent is hereby corrected as shown below:

COLUMN 3:

Line 8, "denoting" should read --denotes--;
    Line 32, "sub-scanning" should read --subscanning--; and
    Line 40, "sub-scanning" should read --subscanning--.

COLUMN 4:

Line 2, "main-scanning" should read --main scanning--;
    Line 46, "sub-scanning" should read --subscanning--;
    Line 49, "sub-scanning" should read --subscanning--; and
    Line 66, "serving" should read --serves--.

COLUMN 5:

Line 4, "sub-scanning" should read --subscanning--;
    Line 9, "sub-scanning" should read --subscanning--;
    Line 52, "sub-scanning" should read --subscanning--;
    Line 58, "Ymax" should read --$Y_{max}$--;
    Line 65, "sub-" should be deleted;
    Line 66, "scanning" should read --subscanning--; and
    Line 67, "sub-scanning" should read --subscanning--.

UNITED STATES PATENT AND TRADEMARK OFFICE
CERTIFICATE OF CORRECTION

PATENT NO. : 5,818,505

DATED : October 6, 1998

INVENTOR(S) : MANABU KATO

It is certified that error appears in the above-identified patent and that said Letters Patent is hereby corrected as shown below:

COLUMN 6:

Line 3, "sub-scanning" should read --subscanning--;
    Line 4, "sub-scanning" should read --subscanning--;
    Line 5, "sub-scanning" should read --subscanning--;
    Line 8, "sub-scanning" should read --subscanning--;
    Line 13, "and" should read --or--;
    Line 14, "sub-scanning" should read --subscanning--;
    Line 20, "sub-scanning" should read --subscanning--; and
    Line 21, "by referring to FIGS. 4 to 6," should read --FIGS. 4 to 6 show--.

COLUMN 7:

Line 3, "for eyes" should read --to the eye--;
    Line 4, "half" should read --by half--;
    Line 5, "dot." should read --dot or more.--;
    Line 34, "In FIG. 6, there are shown" should read --FIG. 6 shows--;
    Line 50, "sub-scanning" should read --subscanning--;
    Line 55, "sub-scanning" should read --subscanning--; and
    Line 62, "is" should read --is the--.

COLUMN 8:

Line 32, "sub-scanning" should read --subscanning--;
    Line 50, "15 $\mu$m" should read --15 $\mu$m,--;
    Line 51, ", the" should read --the--; and
    Line 63, "sub-scanning" should read --subscanning--.

UNITED STATES PATENT AND TRADEMARK OFFICE
CERTIFICATE OF CORRECTION

PATENT NO. : 5,818,505

DATED : October 6, 1998

INVENTOR(S) : MANABU KATO

It is certified that error appears in the above-identified patent and that said Letters Patent is hereby corrected as shown below:

COLUMN 9:

Line 8, "a $f_\theta$ lens 26 having" should read --the $f_\theta$ lens has--;

Line 36, "sub-scanning" should read --subscanning--;

Line 57, "sub-scanning" should read --subscanning--; and

Line 63, "reducing" should read --thereby reducing--.

COLUMN 10:

Line 12, "sub-scanning" should read --subscanning--.

Signed and Sealed this

Thirteenth Day of July, 1999

*Attest:*

Q. TODD DICKINSON

*Attesting Officer*  Acting Commissioner of Patents and Trademarks